Jan. 4, 1972  D. L. MILLER  3,632,712
METHOD FOR CURING OF PNEUMATIC TIRES
Filed April 10, 1969  2 Sheets-Sheet 1

INVENTOR.
DAVID L. MILLER
BY *James A. Lucas*
ATTORNEY

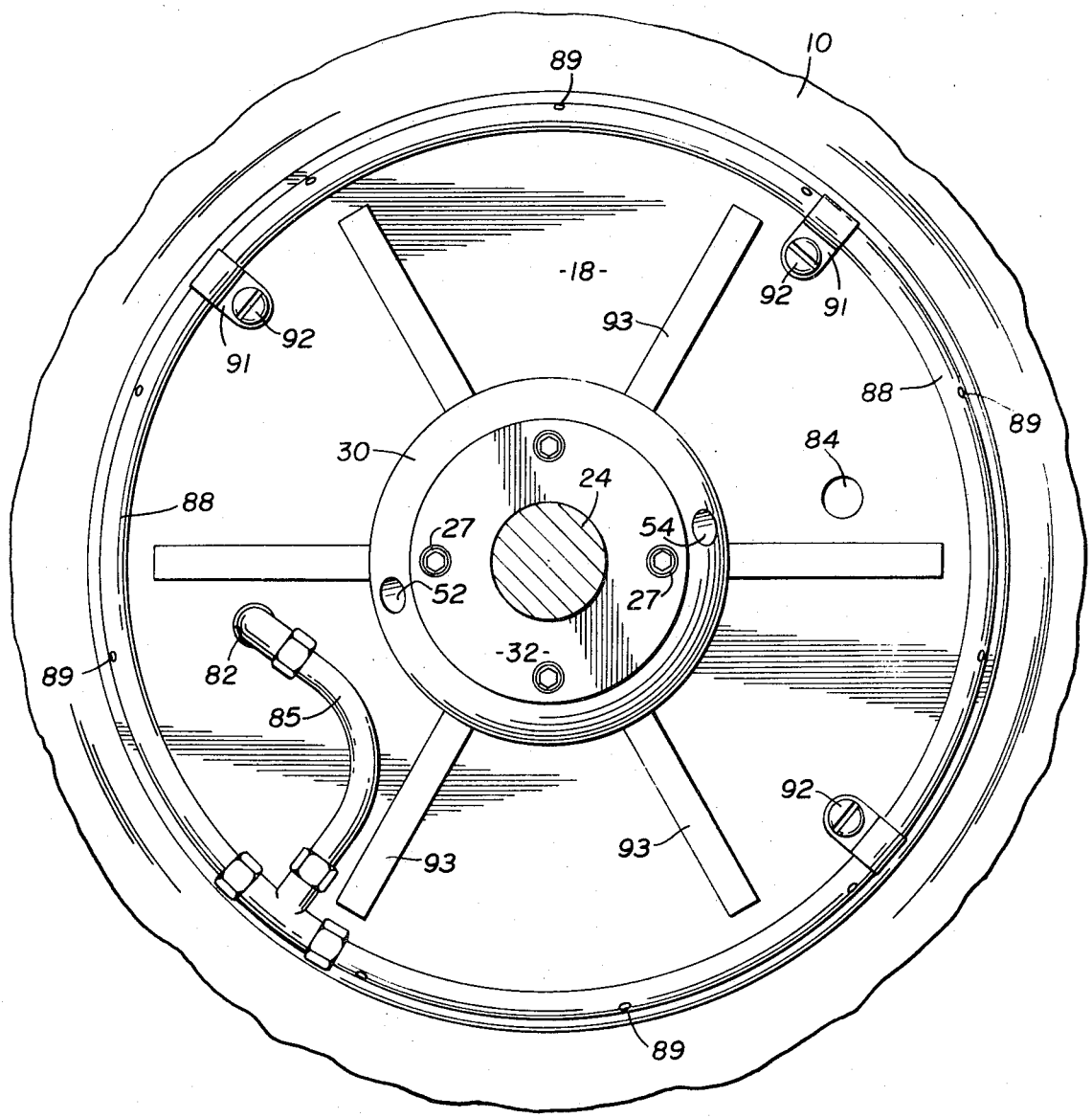

United States Patent Office 3,632,712
Patented Jan. 4, 1972

3,632,712
METHOD FOR CURING OF PNEUMATIC TIRES
David L. Miller, Edwardsport, Ind., assignor to The
General Tire & Rubber Company
Filed Apr. 10, 1969, Ser. No. 815,126
Int. Cl. B29h 5/02
U.S. Cl. 264—94                     4 Claims

ABSTRACT OF THE DISCLOSURE

Pneumatic tires utilizing nylon cords to reinforce the tire carcass are placed in a conventional tire curing mold and are cured at elevated temperatures and pressures followed by cooling in the mold with water at ambient temperature while maintained at substantially the same pressure. By partially cooling the tire in the mold, the tensile strength of the nylon cords is preserved and the tread life is prolonged. During cooling the water is added concomitantly with the steam and at a fixed volume ratio therewith, to maintain sufficient pressure within the mold thereby preventing retraction of the tire from the mold. The process which provides more uniform cooling is also applicable to tires containing cords made from textiles other than nylon.

BACKGROUND OF THE INVENTION

Figure 1:
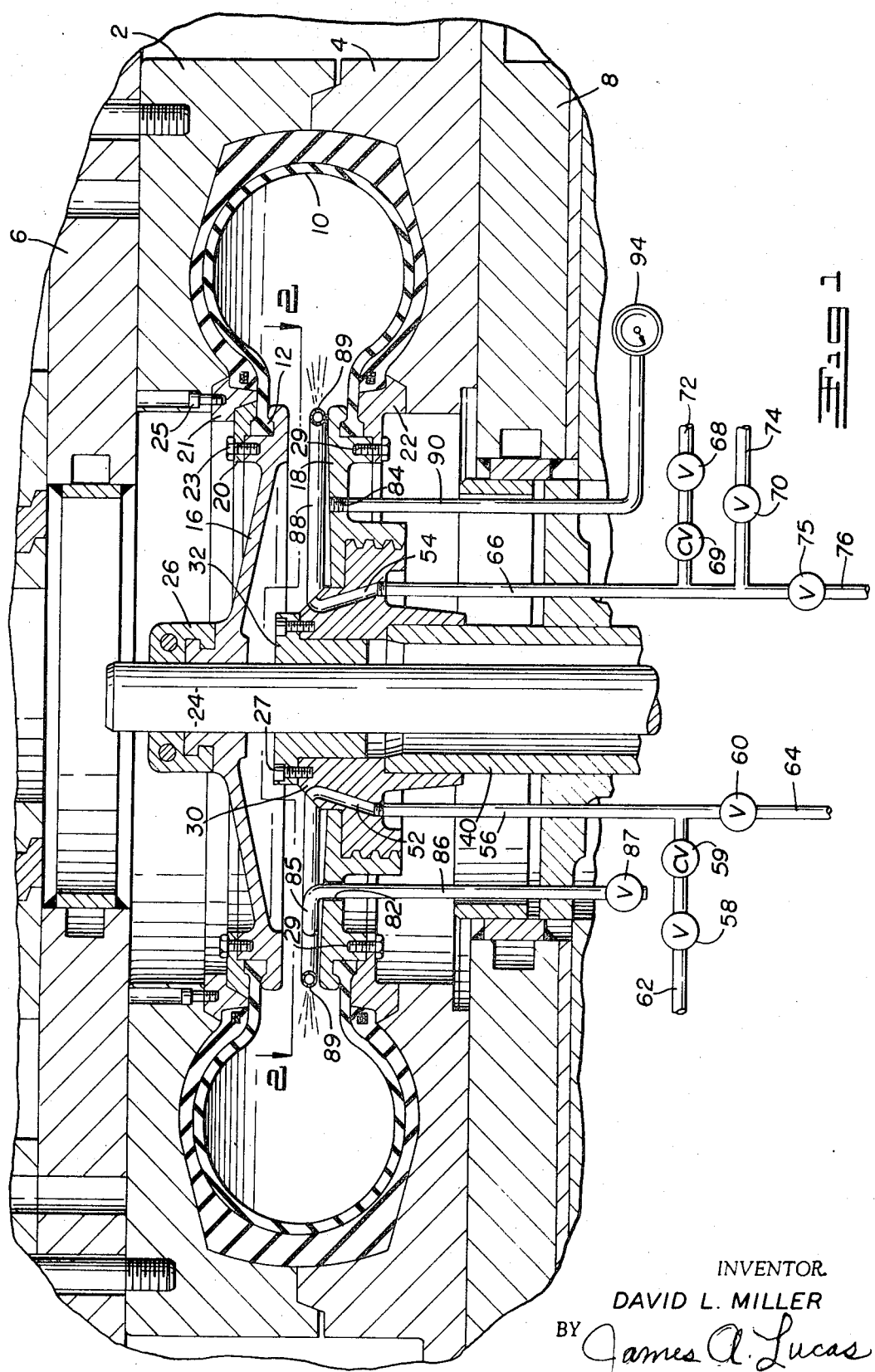

The use of nylon cord reinforcement for pneumatic tires is old. Nylon cord fabric is commonly used in the carcass of the tire as well as in the breakers and belts. Nylon has many desirable characteristics, among them being high tensile and flexual strength, and the ability to be securely bonded to rubber.

The use of nylon cord in tires also has several disadvantages. One of these involves the tendency of the nylon cord, when subjected to continuous stress and heat in use, to become permanently elongated. This causes tread cracking resulting in rapid tread wear. In an attempt to overcome this problem of elongation and tread cracking, it has become a common practice to prestretch nylon cord followed by embedding the cord in rubber while in the prestretched condition. This has not provided a complete solution to the problem, however.

A method is described in U.S. Pat. No. 3,002,228 issued on Oct. 3, 1961 and assigned to the assignee of the present invention, for treating tires made with prestretched nylon to substantially eliminate the aforementioned problem. According to this patent, a tire casing is placed in a curing mold and is heated to a temperature above 300° F. for a sufficient period of time to effect the desired vulcanization of the rubber. During the curing cycle, steam at a pressure in excess of 100 p.s.i. is introduced into rubber curing tube or bladder within the tire to transfer heat to the inside of the tire to force the tire into the contour of the mold. Near the end of the curing cycle, the steam is replaced with hot water followed by replacement with cold (i.e. not preheated) water while maintaining an internal pressure that is not substantially less than that of the steam. During this time the curing temperature is reduced from an initial value in excess of 300° F. to a temperature of 260° F. or less after which the tire is removed from the mold.

By cooling the tire in the mold while maintaining the normal internal pressure to prevent the cords from shrinking, a more complete cure of the rubber in the tire can be achieved before removal from the mold. This decreases the likelihood of shrinking of the nylon cord.

BRIEF DESCRIPTION OF THE INVENTION

One object of the present invention is a simplified method of improving the quality and uniformity of tires by means of more uniform cooling in the curing mold.

Another object is the elimination of one step in the process of cooling a pneumatic tire at the end of the curing cycle.

Yet, another object is to reduce the tensile strength degradation of nylon cords when used in tires.

These and other objects are accomplished in the following manner with specific reference to the drawings in which:

FIG. 1 is a cross-sectional view of a typical curing mold of the type conventionally used to cure pneumatic tires, modified to the extent necessary to practice the invention; and FIG. 2 is a view taken along lines 2—2 of FIG. 1, showing a lower clamping ring of the mold modified to achieve more uniform cooling.

DETAILED DESCRIPTION OF THE INVENTION

The present invention constitutes an improvement in the method and apparatus for curing pneumatic tires as described in the aforesaid Salem et al. patent, whereby the step of using hot water to replace the steam is omitted resulting in a savings of time, an increase in efficiency, more uniform cooling and the elimination of unnecessary piping and other equipment.

During a conventional curing cycle, steam at a pressure of at least about 135 p.s.i., and preferably above about 175 p.s.i., is introduced into the core or curing bladder in a tire mold. According to the invention, cooling water or other liquid cooling fluid is introduced into the core or curing bladder at the end of the steam curing cycle to displace the steam and to quickly reduce the temperature of the tire. Steam is continuously introduced into the core along with the water, and at a fixed ratio therewith to compensate for the condensation that occurs with the introduction of the cooling water. In this manner, no appreciable drop in pressure occurs in the mold during curing and while the core is being filled with water. When the tire has been cooled to the desired temperature, the water is removed from the core and the tire is removed from the mold. It may then be further cooled, if desired, on a post-cure inflation rim of the type shown in FIG. 2 of the aforementioned Salem et al. patent.

Referring now to FIG. 1 there is shown a portion of a tire curing press containing a mold cavity in which a tire is shaped and cured. The mold cavity is formed by a top mold half 2 and a bottom mold half 4 bolted or otherwise secured to top and bottom steam heated platens 6, 8 respectively. Within the mold is a tubular diaphragm or curing bladder 10 fabricated from rubber or the like. The edges of the bladder terminate in enlarged feet, with the lower foot 14 securely clamped between lower clamping ring 18 and lock ring 22 and the upper foot 12 gripped between the upper bladder clamping ring 16 and lock ring 20. The lower lock ring 22 is attached to the lower clamping ring by bolts 29 and forms the lower bead ring for the tire. The upper lock ring 20 is secured to the upper bladder clamping ring 16 by bolts 23 or other suitable means and registers with upper bead ring 21 which is secured by bolt 25 or the like to the top mold half 2. The top mold half is attached to a suitable mechanism (not shown) which permits this portion of the mold to be lifted and pivoted away from the bottom mold half.

The top bladder clamping ring 16 is secured by clamp 26 to piston rod 24 with the top mold half moved away from the bottom half, the rod is moved upwardly in an axial direction to separate the upper clamping ring 16 from the lower clamping ring 18 thereby causing the bladder to assume a generally cylindrical shape to permit a green tire to be placed in the mold around the bladder and a cured tire to be removed therefrom.

The bottom clamping ring 18 is threaded onto a clamp ring hub 30 to which a cylinder cap 32 is joined by bolts 27. The hub 30 is joined to the end of hydraulic cylinder 40 and contains a bore through which the piston rod 24 moves.

The hub 30 contains a pair of passageways 52, 54 extending therethrough in communication with the space between the upper and lower clamping rings 16, 18 and the interior of the bladder. Line 56 is threaded into or otherwise joined to the first passageway 52, and is connected by regulator valve 58 and check valve 59 to steam line 62 and by regulator valve 60 to drain line 64. Passageway 54 is connected by line 66, check valve 69 and regulator valve 68 to a second steam inlet 72, by valve 70 to a vacuum line 74 and by valve 75 to water discharge line 76. Through the lines 56, 66 steam can be introduced and condensate withdrawn from the curing bladder.

A pair of holes 82, 84 extend through lower clamping ring 18. Line 86 threaded into hole 82 communicates with a source of unheated cooling water. This water is fed by line 86 through the hole 82 and through connector 85 to a water spray ring or distributor 88 secured to the periphery of the clamping ring. This spray ring contains a plurality of small holes axially spaced around its perimeter, arranged to direct a stream of water upwardly and outwardly at an angle of about 45° generally against the portion of the curing bladder that is in proximity to the upper shoulder region of the tire. Line 90 leading from the other hole 84 forms a conduit between the interior of the curing mold and a suitable pressure gauge 94.

Further details of the invention are shown in FIG. 2. In this figure the spray ring connector 85 communicates with the hole 82 in the lower clamping ring. The connector is joined to the spray ring 88 which contains a plurality of holes 89. Clips 91 and screws 92 hold the spray ring in place around the periphery of the clamping ring. The clamping ring is threaded into the hub 30 and the cylinder cap 32 fits inside and is bolted to this hub, closely surrounding the piston rod 24. A plurality of reinforcing ribs 93 are evenly spaced around the clamping ring.

In a normal curing cycle a green or uncured tire in the shape of an annular cylinder is placed over the curing bladder or core which is generally cylindrical when the mold is opened. As the mold is closed, the curing bladder is urged radially outwardly to force the tire into the mold cavity. The platens of the press are heated to and maintained at an elevated temperature by steam or other means.

When the mold is completely closed, a suitable curing fluid such as steam typically at a pressure of between about 175 and 200 p.s.i. and a temperature of between about 375 and 385° F. is introduced into the curing bladder through one or both of lines 56, 66 and passageways 52, 54 to rapidly build up the pressure and the temperature inside of the tire for curing. During this period of time water valve 87 and valves 60, 70 and 75 are all closed. In the final stage of the cure cycle, when vulcanization is almost complete, valve 87 on line 86 is opened to permit cooling fluid such as water to be introduced into the bladder through the spray ring 88 while steam is admitted through both inlets 56, 66. The high steam flow is needed during the initial period that water is introduced into the curing bladder to off-set the rapid formation of condensate and to prevent a rapid loss of pressure within the mold. Both of the steam inlets 56, 66 remain open until the cooling water at ambient temperature completely fills the curing bladder. The pressure of the water is normally determined by the capacity of the pumps used to distribute the water through the tire plant and will typically be above 200 pounds p.s.i., and preferably about 250 p.s.i. In any event, it is higher than the pressure of the steam and displaces all of the steam in the core. The period required for displacement may be approximately 10 to 30 seconds. Check valves 59, 69 prevent backup of water in the steam lines during this step.

When the curing bladder is completely filled with water, valves 58, 68 are closed to shut off the steam. Valve 75 is then opened to permit fresh water to be circulated through the curing bladder and to be discharged through lines 66 and 76. When the temperature of the tire has been reduced to a sufficiently low level to accomplish the desired results, the water is drained from the bladder through line 64 and a vacuum is drawn through line 74 to pull the bladder away from the tire after which the curing press is opened and the tire is removed.

The temperature of the tire is thus reduced while the tire is still in the mold and is still under substantially the same pressure as it was throughout the steam cure. This cooling under pressure appears to remove the stresses developed in the nylon cord during curing. If the internal pressure is suddenly reduced while the tire is still at a temperature above 300° F., serious degradation of the nylon cord may occur particularly where the moisture content of the cord is above about 1%. Further, if the proper ratio of water to steam entering the bladder during the cooling cycle is not maintained, the pressure within the bladder will rapidly drop and will cause the tire to retract from the mold and the vents to withdraw from the vent holes. If the pressure is again built up with cold water, the tire is again formed into the mold, resulting in bending of the vents, formation of a secondary mold imprint and possible damage to the tire.

Vulcanization of the tire continues throughout the cooling cycle, but at a slower rate than during the steam curing cycle. If there is a sudden loss of pressure at the start of the cooling cycle, when the tire is not yet completely cured, ply separations and porosity in the rubber are likely to occur.

For these reasons, an essential feature of the present invention is the significant relationship between the volume of steam that must be introduced into the bladder concomitantly with the cooling water to compensate for the rapid condensation of steam to water, and to prevent any substantial loss of pressure. It was found that the volume ratio of steam to water, being introduced to the curing bladder should be at least 15:1 and preferably about 20:1. Thus, when using a pair of ¾" I.D. inlet lines for the steam, it was found that equilibrium could be achieved between the amount of steam being cooled and condensed to water and the amount of fresh steam being introduced into the bladder by providing 12 equally spaced holes in the water spray ring, these holes drilled with a number 50 drill. Thus, the total cross-sectional area of the steam inlets is about 0.884 in. sq. whereas the corresponding area for the water inlets is about 0.046 in. sq., a ratio of about 19:1. Lower ratios of steam to water can be used so long as the pressure in the bladder does not drop below a value that will cause retraction of the tire from the mold. Another significant factor is the necessity of using a water discharge line having a cross section no larger than that of the water supply line. This helps to prevent a sudden loss of pressure within the curing bladder during the circulation of cold water through the bladder.

There are many changes that can be made in practicing the teachings of the present invention without departing from the scope thereof. For example, the cooling fluid can be introduced into the mold by means other than a spray ring as described. Thus, a plurality of small pipes and nozzles can be used to introduce this fluid. Alternatively, the lower clamping ring can be designed to incorporate a distribution system integrally therein. Furthermore, the number and location of the spray outlets can be varied. As previously mentioned, the cooling fluid is directed radially outwardly and upwardly to contact the tire curing bladder in the area of the upper shoulder region of the tire. As a tire is being cured, some of the steam condenses and accumulates in the lower portion of the mold. This produces a temperature differential between the upper and lower halves of the tire with the lower half being cooler due to the presence of the condensate. By directing the cooler incoming water against the hotter portion of the tire, more effective and uniform cooling is achieved.

The times and temperatures that are needed to cure a tire are dependent upon many factors among them being the size of the tire, the efficiency of the mold, the rubber composition and the vulcanizing system that is used. In practicing the teachings of the present invention, the various time intervals during which steam, steam and water, and water are being circulated through the mold to cure and to cool the tire are subject to great variation. These can be readily calculated by one skilled in the art of curing tires. Passenger tires are normally cured at a temperature of about 310 to 350° F. and are then cooled, while in the mold, to about 270 to 300° F. after which they are removed and treated to post cure inflation. The invention is not limited, however, to passenger tires but may include small industrial tires, truck tires and large off-the road tires as well.

Although the invention has been described with specific reference to a platen press, it can also be used with a dome-type press or other press or mold in which tires are cured.

By the teachings of the invention, it is possible to provide more uniform curing temperatures in the tire, to reduce the curing time and to produce a tire having improved radial and lateral uniformity.

Other variations can be made in the teachings of the present invention without departing from the scope thereof which is delimited by the following claims in which I claim:

1. In a curing cycle for a pneumatic tire having structural characteristics requiring that internal pressure within said tire be maintained substantially constant throughout said cycle, said cycle characterized by a heating period wherein steam at a selected temperature and pressure is supplied internally of the tire to initiate the cure of the tire and a cooling period wherein water at a selected temperature and pressure is supplied internally of said tire, the improvement wherein said internal pressure is maintained substantially constant by continuing the supply of said steam simultaneously with said water at the start of said cooling period until said water has substantially filled said tire and thereafter discontinuing said supply of steam.

2. In the improved curing cycle as defined in claim 1, wherein said improvement further comprises continuing the supply of water after discontinuance of said supply of steam until said tire is cooled to a selected temperature.

3. In the improved curing cycle as defined in claim 1, wherein said water is supplied as a plurality of sprays from annularly arranged locations internally of said tire.

4. In the improved curing cycle as defined in claim 3, further comprising continuing the supply of water after discontinuance of said supply of steam until said tire is cooled to a selected temperature.

References Cited

UNITED STATES PATENTS

| | | | |
|---|---|---|---|
| 1,605,683 | 11/1926 | Meyer et al. | 264—315 |
| 2,858,566 | 11/1958 | Brundage | 18—17 W |
| 3,002,228 | 10/1961 | Salem et al. | 264—315 |

ROBERT F. WHITE, Primary Examiner

J. H. SILBAUGH, Assistant Examiner

U.S. Cl. X.R.

18—6 T, 17 K; 264—315, 326